Sept. 1, 1931.   L. J. CARTIER   1,821,791
MALLEABLE JEWEL MOUNTED ON A DEFORMABLE BASKET WORK
Filed Dec. 2, 1930
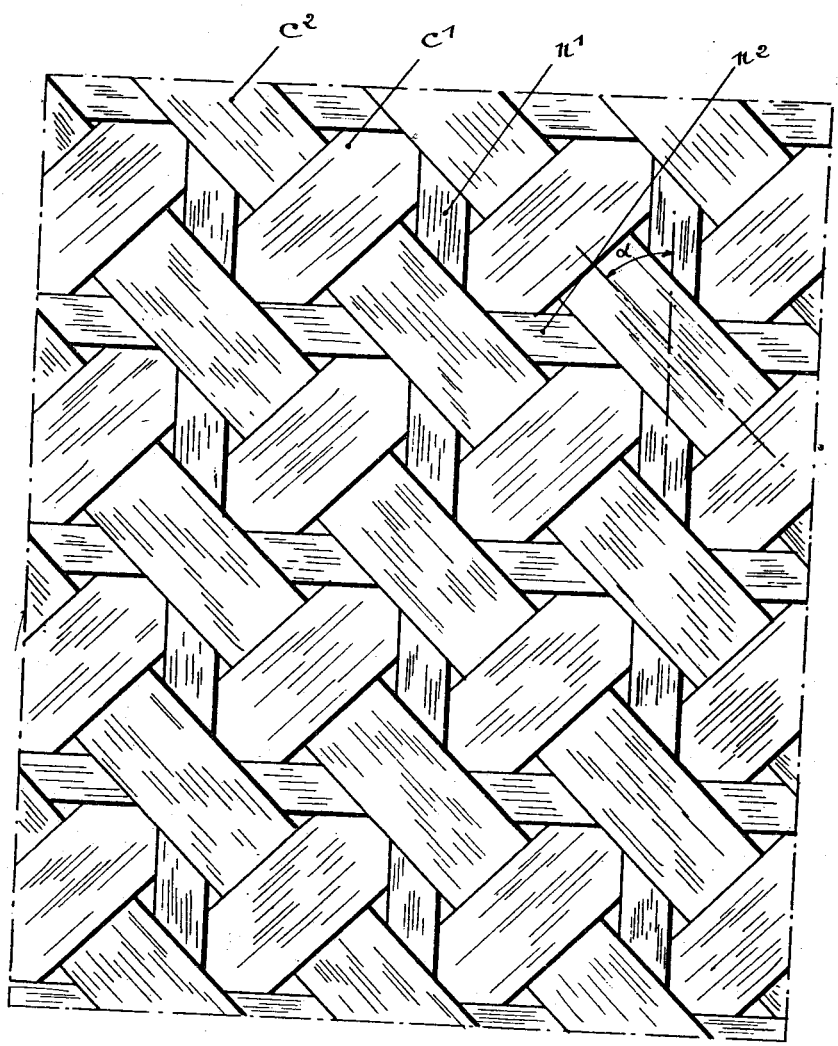
Applicant:-
Louis Joseph Cartier
By Mauro & Lewis,
Attorneys Patented Sept. 1, 1931

1,821,791

UNITED STATES PATENT OFFICE

LOUIS JOSEPH CARTIER, OF BUDAPEST, HUNGARY, ASSIGNOR TO CARTIER SOCIETE ANONYME, OF PARIS, FRANCE, A COMPANY OF FRANCE

MALLEABLE JEWEL MOUNTED ON A DEFORMABLE BASKET WORK

Application filed December 2, 1930, Serial No. 499,607, and in France June 2, 1930.

In my application filed April 24, 1930, Serial No. 446,958 I have described a malleable jewel mounted on a deformable metallic basket-work. My present invention has for its object certain improvements in said basket-work intended to prevent the breaking of the metallic strips or wires which occurred after a certain time and was due to the fact that this basket-work was made of elements woven at right angles to one another so that lines of lesser resistance were produced parallelly to these elements.

My improvements consist in adding to the woven texture made of elements at right angles to one another woven texture of similar shape but making an angle of 45° with the first one, and in interweaving these two textures. A basket-work without lines of lesser resistance is thus obtained and the metal can be bent without any risk of breaking.

The appended drawing shows my improved basket-work comprising a first texture made of elements $c^1$ $c^2$ at right angles to one another, said texture being interwoven with another texture made of narrower elements $n^1$ $n^2$ also at right angles to one another. The drawing shows that the elements of the two textures make between them an angle which is preferably equal to 45°, so that the whole of the basket-work is absolutely symmetrical.

What I claim is:

1. A jewel mounted on a deformable metallic basket-work consisting of two textures making between them a certain angle and interwoven.

2. A jewel mounted on a deformable metallic basket-work consisting of two textures making between them an angle of 45° and interwoven.

In testimony whereof I have signed this specification.

LOUIS JOSEPH CARTIER.